United States Patent [19]

Menges et al.

[11] 4,178,104
[45] Dec. 11, 1979

[54] METHOD AND APPARATUS FOR MIXING VISCOUS MATERIALS

[75] Inventors: Hans G. L. Menges, Laurensberg b. Aachen; Engelbert G. Harms, Vaalserquartier b. Aachen; Rainer Hegele, Ehningen, all of Fed. Rep. of Germany

[73] Assignee: Uniroyal, AG, Aachen, Fed. Rep. of Germany

[21] Appl. No.: 873,316

[22] Filed: Jan. 30, 1978

Related U.S. Application Data

[63] Continuation of Ser. No. 641,790, Dec. 18, 1975, abandoned, which is a continuation of Ser. No. 379,537, Jul. 16, 1973, abandoned.

[30] Foreign Application Priority Data

Jul. 21, 1972 [DE] Fed. Rep. of Germany ....... 2235784

[51] Int. Cl.$^2$ ............................................. B29B 1/06
[52] U.S. Cl. ........................................ 366/80; 366/90
[58] Field of Search .................. 366/149, 183, 80, 90, 366/79, 88, 324, 76, 75, 81; 425/207, 208, 209

[56] References Cited

U.S. PATENT DOCUMENTS

| | | | |
|---|---|---|---|
| 3,023,455 | 3/1962 | Geier | 366/183 |
| 3,108,530 | 10/1963 | Zies | 366/149 |
| 3,169,752 | 2/1965 | Laubarede | 366/80 |
| 3,458,894 | 8/1969 | Wheeler | 366/90 |
| 3,505,085 | 4/1970 | Straughn | 366/149 |

*Primary Examiner*—Robert W. Jenkins
*Attorney, Agent, or Firm*—Jack Posin

[57] ABSTRACT

A single-screw extruder and process for mixing viscous materials, for example, rubber mixtures and thermoplastic materials. The process and apparatus includes inserting a plurality of obstacles in the flow path of the material stream in the interior of the extruder cylinder. The obstacles are in the form of a number of series of studs protruding into the cylinder and accommodated by respective gaps or openings in the threads of the screw. The depth of penetration as well as the number of studs can be varied and adjusted by automatic means. The penetrating portion of the studs can be of different shapes according to the requirements for a thorough and turbulent deflection and mixing of the material stream.

18 Claims, 5 Drawing Figures

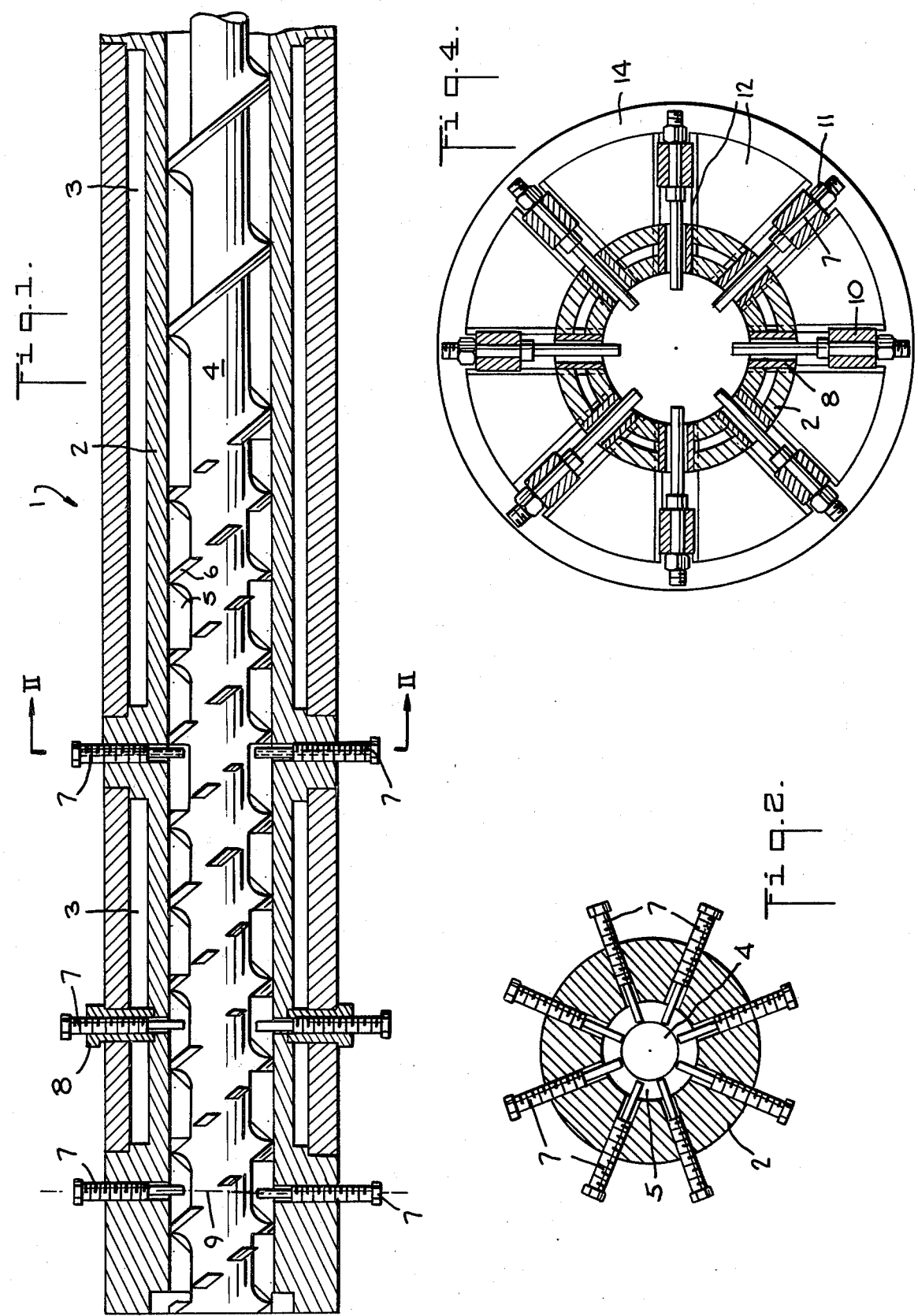

METHOD AND APPARATUS FOR MIXING VISCOUS MATERIALS

This is a continuation, of application Ser. No. 641,790, filed Dec. 18, 1975 which is a continuation of application Ser. No. 379,537, filed July 16, 1973, both abandoned.

The invention relates to a method and apparatus for the processing or mixing of highly viscous materials, e.g., rubber mixtures, thermoplastic materials and the like in single screw extruders.

It is known in the art, in the processing or mixing of such viscous material to subject the material to a kneading and blending in an extruder having a screw conveyor rotating inside a housing. The screw can have a single flight or plurality of flights of screw threads. The pitch or lead of any flight as well as the depth of the screw channel can be constant or variable. In the method, different mixing means are used to achieve a satisfactory blending of the material during its feed along the screw conveyor. It is for instance known to change the lead or pitch of the conveyor screw flights at periodic or variable intervals or to interpolate reversibly directed flights of screw threads or to interrupt the thread of the screw by gaps. The material is directed into vortex-like patterns that bring about a blending of the various and irregular flow paths caused by these mixing means. These mixing means, however, are each located on the screw conveyor and are ordinarily rigidly mounted thereon. As a result, an optimum blending or mixing effect can be achieved only for the material for which the screw conveyor has been designed. In regard to other materials, the screw conveyor must be removed from the housing. The removal or changing of the screw conveyor is cumbersome and expensive. In addition, in the aforementioned screw conveyors, it is not possible to make any adjustment during the blending of mixing process, i.e., during the operation of the apparatus.

It is an object of the invention to achieve a satisfactory mixing and homogenizing effect of the material in the processing of highly viscous materials with a high material flow rate through the extruder, such that the mixing process can be varied in a controllable manner as the material passes through the screw conveyor.

According to the invention the material flow is substantially in a forward-directed movement through the extruder. The flow path is subjected to a plurality of separations at specific instances causing local vortexing. The extruder comprises a single screw conveyor rotating inside a housing and a plurality of obstacles, such as bosses, studs or pins, which project or protrude into the space formed by the lands of the conveyor screw threads between the body of the screw and the housing. The depth of penetration, the shape and the number of obstacles can be varied according to the materials subject to mixing and the degree of mixing desired. The flow path of the material through the extruder and along the screw conveyor is therefore subject to local vortex formations of the material. At the interface between the material and the housing and the screw thread, respectively, there is a continuous change in the surfaces within the material which come in contact, bringing about an intensive exchange of material and heat. Furthermore, in cooperation with the screw, there is an alleviation to a large extent by a shearing flow within the material as a result of high pressure gradients. In addition a high material flow rate is possible accompanied by an optimum mechanical and thermal homogeneity of the extrusion product. Moreover, the present invention requires a low specific power consumption and, therefore, avoids difficulties due to the temperature of the extruded product, as may occur in the processing of rubber mixtures having any desired proportion of natural rubber and filler materials. The low specific power consumption, further enables the mixing and blending of rubber materials and mixtures thereof which are capable of high flow rates or may, at higher screw speeds, exhibit vulcanization behavior.

A further advantage of the present invention is that the obstacles are arranged or located in the housing and thereby permitting the use of a standard screw design. Furthermore, the extruder of the present invention tends to be self-cleaning resulting in efficient and economical operation.

A further feature of the invention is that the blending and mixing can be a function of the state of the material, for instance, its temperature, the mixture grade, the flow rate and the like. This is achieved by adjusting the depth of the penetration of the obstacles projecting into the flow path of the material. As a result, it is possible to avoid differences in quality in the extruded product, which are brought about by variations in the mixture, or by a mixing change or a change in material.

The obstacles are preferably formed of a heat-conductive material. The obstacles can furthermore be provided with a bore hole or the like. As a result an improved heat dissipation is provided which is especially desirable in the processing of rubber mixtures. In addition it is possible to provide a controlled heat supply in the processing of thermoplast powders or granulates.

The obstacles are selectively arranged along the circumference of the housing either longitudinally and/or in a cross-sectionally annular arrangement. Since the depth of penetration or projection of the obstacles is adjustable it is possible to use all the obstacles or a selected number of such obstacles as well as a desired length of any obstacle or to use the obstacles in locally different positions. The penetrated free end of all or any of the obstacles can be provided with a desired cross-sectional shape or the like to increase or decrease flow resistance. The adjustment of the obstacles so as to vary the depth of penetration can be carried out manually, mechanically or automatically. Alternatively the adjustment of the depth of penetration of the obstacles can be by a common actuation means. The obstacles are generally transverse to the extruder housing and extend externally of the housing. The obstacles can be moved radially to the housing by means of a control means, e.g., a cam control.

The invention will be better understood from the following description when read in connection with the accompanying drawings, in which:

FIG. 1 schematically illustrates a longitudinal cross-sectional view of a portion of a single screw extruder in accordance with the invention;

FIG. 2 represents a cross-sectional view along line II—II of FIG. 1;

FIG. 4 shows a cross-sectional view along line IV—IV of FIG. 3; and

Figure 3:
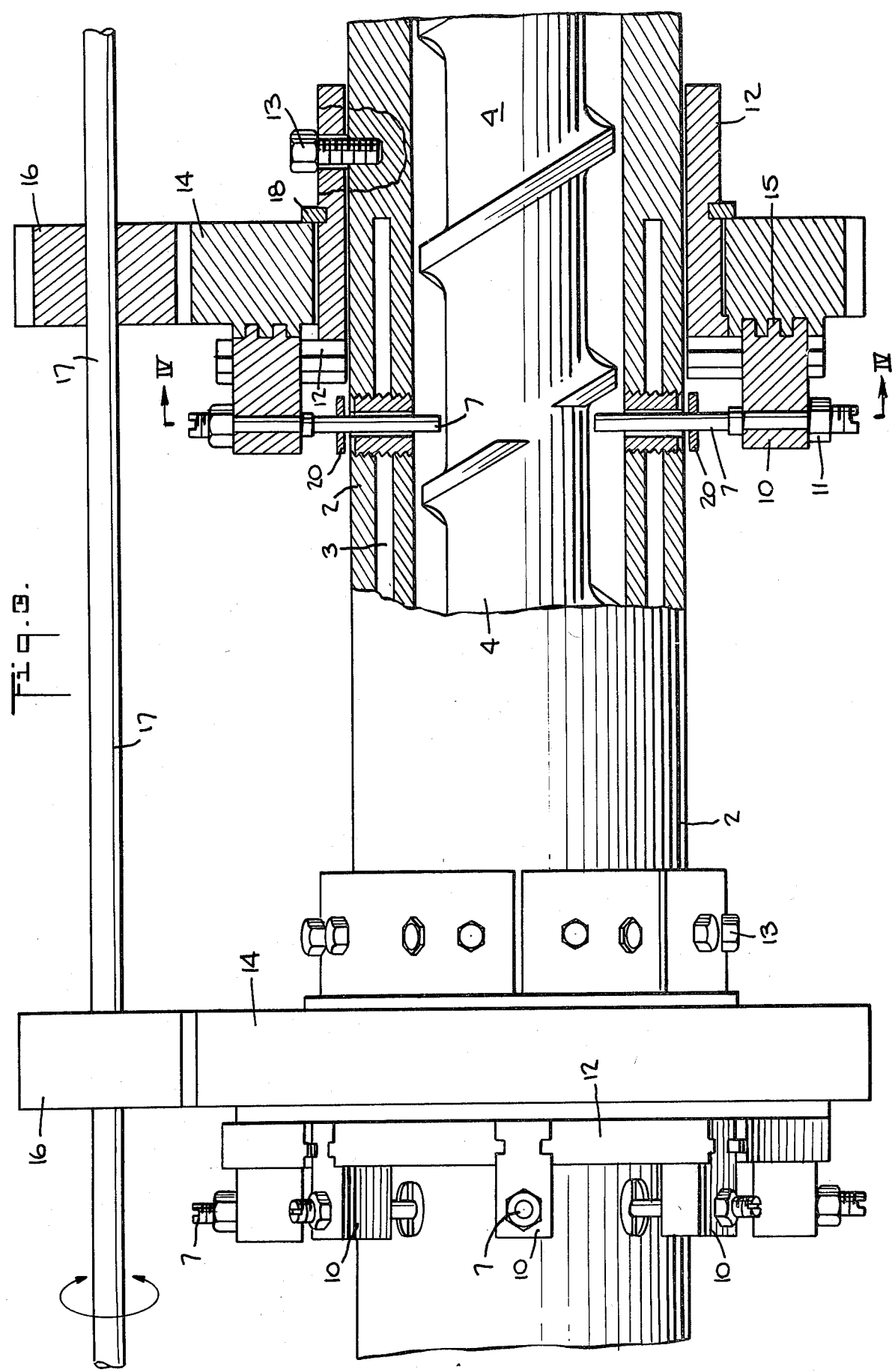
FIG. 3 illustrates a portion of the single-screw extruder of FIG. 1, in part as an elevational view and in part as a cross-sectional view of a means for the common actuation of the projecting obstacles.

The extruder 1 has a housing 2 containing a screw conveyor 4. The housing may include an annular screw conveyor 4 provided at one end with a drive means for rotating the screw such as to cause the direction of material flow to be in a right to left direction of FIG. 1. Located generally radially transverse to and circumferentially about housing 2 in a desired longitudinal spacing, is a selected plurality of obstacles 7 in the form of bosses, studs, pins or the like. The obstacles penetrate or project into the space 5 between the screw lands 6. In the embodiment shown in FIG. 1, the obstacles 7 comprise pins having screw threads engaging the housing enabling the manual adjustment of the depth of penetration or projection into space 5. At the longitudinal spaces along housing 7 where the obstacles 7 traverse the heating or cooling space 3 there are provided bushings 8. The obstacles are radially adjustable up to a point close to the core of the screw. The penetrating free end of the obstacle 7 can be provided with a cylindrical or streamline or another suitable cross-sectional shape favorable for mixing or depending on the flow properties of the material. As shown in FIG. 2, by way of example there are distributed around the circumference of the housing eight obstacles for each series of obstacles, there being three series shown in FIG. 1. The obstacles may be formed of a particularly good heat-conductive material, for instance, copper-beryllium, in order to improve heat dissipation and, in the case of thermoplastic materials, a controlled heat supply. The obstacles can further be longitudinally drilled thereby providing a means of injecting mixture components in liquid or plastic form into the inside of the cylinder.

Figure 5:
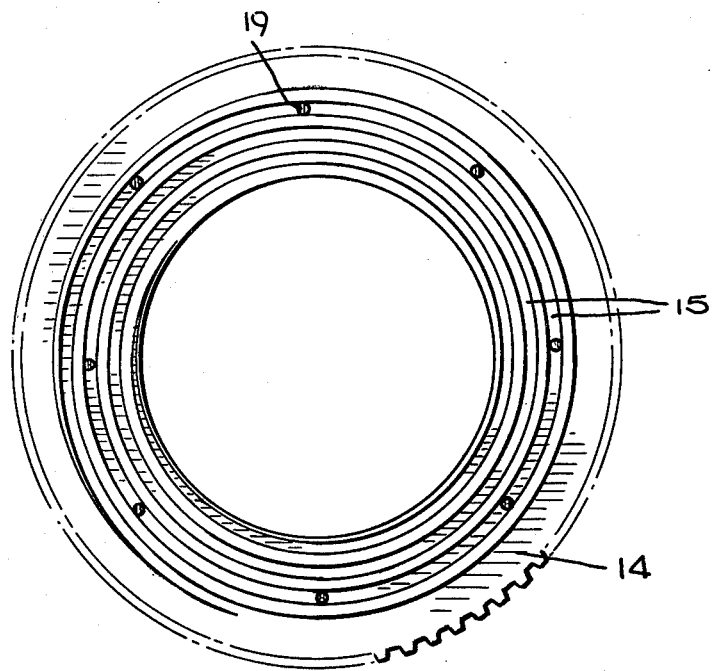
FIG. 5 shows a cross-sectional view of a cam control means for the common actuation of the obstacles.

FIGS. 3, 4 and 5 illustrate an embodiment for the mechanical radial displacement of the obstacles. The radial adjustment can be provided, as desired, for one or more series of obstacles. The obstacles 7 are each threaded into a holding fixture 10 and are preferably securely connected with the holding fixture 10 by means of locknuts 11. The holding fixture 10 is radially displaceable within supporting guideways 12 fixedly mounted on the housing 2 by means of screws 13. Radial adjustment of the depth of penetration or projection of obstacles 7 is provided by control means including a gear 14. A side of gear 14 facing the holding fixture 10 is provided with a cam track 15 engaging corresponding complementary cam followers on the holding fixture 10. Gear 14 is driven by a pinion 16, the pinion 16 being rigidly secured to shaft 17 for rotation. Gear 14 is freely rotatable and prevented from axial movement by a collar ring 18.

FIG. 5 shows a cross-sectional view of the gear 14 indicating the cam track 15. Cam track 15 is shown as a continuous spiral groove which engages a cam follower extending from holding fixture 10. Alternatively, the cam track 15 can be a plurality of discontinuous circular grooves circumferentially arranged on gear 14. In addition the cam track 15 may be formed of a plurality of interrupted arcuate grooves having a regular or irregular configuration and further having a variable regular or irregular radial dimension.

The radial adjustment of the depth of penetration or projection of obstacles 7 is provided by the activation of shaft 17 by suitable drive means. Shaft 17 can rotate in either a continuous direction or reciprocally as needed. Rotation of shaft 17 causes the rotation of pinion 16 which engages gear 14. As gear 14 rotates, the cam followers on holding fixture 10 are guided within the cam track 15. Holding fixture 10, which supports obstacles 7, is therefore radially moved within guideway 12 and the depth of penetration or projection of obstacles 7 is adjusted. The penetrating free end of the obstacle 7 is prevented from striking or abutting against the body or core of screw conveyor 4 by means of stops located at 19 within the cam track 15 or located at 20 on the obstacles.

The mechanical adjustability of the obstacles has a particular advantage since the control means can radially adjust a selected one or more series of obstacles according to an automatic sensing and evaluation of criteria or standards. Standards or criteria of interest, for example, are the material temperature (to be measured preferably at the end of the screw), the flow rate or the quality of the mixture (viscosity, degree of shrinkage or homogeneity). These values can be optimized in a computer and are used as setting values for the depth of penetration of the obstacles by controlling drive shaft 17. As a result, it is possible to automatically control the mixing and homogenizing effect during the operation of the screw by means of the depth of penetration of the obstacles respectively through the number or series of obstacles placed in operation.

A preferred embodiment of the extruder screw 4 comprises a single-flight or a plurality of flights providing an intensive input feed zone subsequently followed by two flights or a plurality of flights as a mixing and homogenizing zone with interruptions 9 in the lands on the screw threads. The depth of the screw channel depends on the strength characteristic of the screw material. Depending on the type of material processed in the screw, the housing can be either cold or heated. A representative extruder suitable for use with this invention is disclosed in U.S. Pat. Nos. 3,652,064 and 3,680,844 and German application No. 2,032,197, the entire contents of each which are hereby incorporated by reference.

While there has been described a preferred embodiment of this invention, it will be obvious to those skilled in the art that various changes and modifications may be made therein without departing from the invention, and it is, therefore, intended that such changes and modifications fall within the scope of the invention as defined by the claims.

What is claimed is:

1. A single screw extruder for mixing and homogenizing viscous materials comprising a screw conveyor for rotation inside a housing, said screw conveyor being an integral member having at least one substantially continuous thread flight of a constant pitch extending helically in the same direction along the longitudinal length of the conveyor for providing a substantially continuous forward feed path of stock material throught the extruder, said flight providing in the feed path direction a first zone for stock material input subsequently followed by a second zone for stock material mixing and homogenizing; the thread in the first zone having uninterrupted lands and the thread in the second zone having spaces between adjacent lands of the screw thread and interrupting gaps in the lands of the screw thread, obstacle means projecting into at least one of said spaces and gaps for penetrating the stock material as the screw conveyor is substantially limited to rotational movement during the forward feed to create vortexing in the material; there being at least one full revolution of the screw thread between axially adjacent obstacle means, and means for adjusting said obstacle means to achieve desired depths of projection thereof relative to the respective gaps and spaces to accommodate different material to be mixed or different mixing conditions and creating local vortexing in the material during the forward feed thereof, each vortex location and degree of vortexing thereat being determined by the adjusted depth of the respective obstacle means.

2. An extruder according to claim 1 wherein the obstacle means is arranged longitudinally along the housing.

3. An extruder according to claim 1 wherein the obstacle means is arranged circumferentially about the housing.

4. An extruder according to claim 1 wherein the obstacle means comprises a plurality of pins arranged longitudinally along and circumferentially about the housing.

5. An extruder according to claim 4 wherein the pins are longitudinally drilled so as to allow access to the space.

6. An extruder according to claim 1 wherein the obstacle means is formed of a heat conductive material.

7. An extruder according to claim 1 wherein the means for controlling the depth of projection is threads on the obstacles which engage the housing.

8. An extruder according to claim 1 wherein the means for controlling the depth of projection is a cam control engaging said obstacle means.

9. An extruder according to claim 8 wherein the cam control comprises a fixture for supporting said obstacle means, said fixture having a cam follower; a gear having a cam track engaging said cam follower; and means for drawing said gear.

10. An extruder according to claim 9 wherein the cam track is a spiral groove.

11. An extruder according to claim 10 wherein the cam track has a stop for limiting the depth of projection of the obstacle means.

12. An extruder according to claim 1 wherein the obstacle means has a stop for limiting the depth of projection.

13. An extruder according to claim 1 wherein there are at least four obstacle means.

14. An extruder according to claim 1 wherein the screw conveyor has substantially a uniform cross-section.

15. An extruder according to claim 1 wherein the obstacle means comprise a plurality of projections lying in substantially the same radial plane to the axial extent of the screw conveyor.

16. An extruder according to claim 15 wherein there are a plurality of radial planes having obstacle means, the radial planes being spaced from each other along the axial extent of the screw conveyor.

17. An extruder according to claim 16 wherein there are at least three radial planes having obstacle means.

18. An extruder according to claim 15 or claim 16 or claim 17 wherein the obstacle means are spaced circumferentially about the housing.

* * * * *